United States Patent [19]

Akashi et al.

[11] Patent Number: 5,437,813
[45] Date of Patent: Aug. 1, 1995

[54] LIQUID CRYSTAL DISPLAY DEVICE

[75] Inventors: Mitsuru Akashi, Kagoshima; Haruhiko Itoh, Tokorozawa; Mikio Murakami, Sakai, all of Japan

[73] Assignee: Hoechst Aktiengesellschaft, Frankfurt am Main, Germany

[21] Appl. No.: 171,101

[22] Filed: Dec. 21, 1993

[30] Foreign Application Priority Data

Dec. 28, 1992 [JP] Japan .................... 4-348551

[51] Int. Cl.$^6$ ............... C09K 19/56; G02F 1/1337
[52] U.S. Cl. ................ 252/197.4; 359/75; 359/103
[58] Field of Search ............ 252/299.01, 299.4; 359/75, 103

[56] References Cited

U.S. PATENT DOCUMENTS

| | | |
|---|---|---|
| 4,405,208 | 9/1983 | Shirai ............... 428/1 |
| 5,067,797 | 11/1991 | Yokokura et al. ............... 359/76 |
| 5,298,590 | 3/1994 | Isogai et al. ............... 528/188 |

FOREIGN PATENT DOCUMENTS

| | | |
|---|---|---|
| 0249881 | 12/1987 | European Pat. Off. . |
| 0362726 | 4/1990 | European Pat. Off. . |
| 0409194 | 1/1991 | European Pat. Off. . |
| 62-297819 | 12/1987 | Japan . |
| 1177514 | 7/1989 | Japan . |
| 3197927 | 8/1989 | Japan . |

OTHER PUBLICATIONS

Macromolecules, vol. 22, No. 11, Nov. 1989, pp. 4143–4147, M. Kajiyama et al., "Synthesis & Characterization of New Multiblock Copolymers Based on Poly(-dimethylsiloxane) and Aromatic Polyamides".

Derwent Abstract No. 1219718 (Hitachi Chemical), Sep., 1989.
Derwent Abstract No. 062616 (Hitachi Chemical), Mar., 1989.
Appl. Phys. Nov. 15, 1984, "A New Highly Multiplexable Liquid Crystal Display", Shiffer et al.
Japanese Abstract No. 1177514A.
Japanese Abstract No. 3197927A.
Japanese Abstract No. 1062616A.
CA Selects: Liquid Crystals, vol. 95, No. 23, Nov., 1981.
Liquid Crystal Display Elements, Vo. 13, No. 303 (P-896) (3651), Jul. 12, 1989.

*Primary Examiner*—Shean Wu
*Attorney, Agent, or Firm*—Curtis, Morris & Safford

[57] ABSTRACT

The liquid crystal display device of the present invention comprises at least one aramide-silicone-multiblock copolymer having the repeating unit represented by the following formula as an alignment layer material:

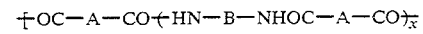

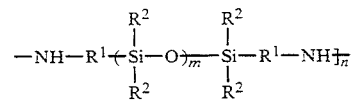

A desired pretilt angle can be obtained by altering the content of polysiloxane in the aramide-silicone-multiblock copolymer and the pretilt angle is nearly uniform irrespective of an annealing temperature and a rubbing strength.

21 Claims, No Drawings

LIQUID CRYSTAL DISPLAY DEVICE

BACKGROUND OF THE INVENTION

A liquid crystal display device is an electrooptical device comprising a liquid crystal material whose optical characteristics vary according to an external electrical field. For example, in a TN (twisted nematic) type liquid crystal display device, an alignment layer is provided on the surface of a solid Substrate so that a liquid crystal molecule on the surface of the substrate is in a uniform alignment state to the surface, and the surface is subjected to a rubbing treatment. That is, a liquid crystal alignment layer has been obtained by preparing a thin film of a polymer such as polyimide, polyvinyl alcohol and polyamide on a solid substrate such as a glass plate according to spin-coating, printing, dipping and the like, curing it and rubbing it in one direction by means of a cloth or the like, and a liquid crystal molecule is arranged in one direction by said liquid crystal alignment layer. Since polyvinyl alcohol among these polymers is poor in heat resistance and moisture resistance, it is not used practically. Generally, polyimide and polyamide are practically used. It is because they satisfy the following conditions:

a) the alignment is chemically stable to heating which is carried out when two substrate are sealed face to face;
b) showing neither solubility nor swelling characteristics to liquid crystal;
c) having a high moisture resistance; and
d) having a high layer-forming properties.

In addition, it has been known that a pretilt angle of a liquid crystal molecule can be obtained by subjecting these polymer films to a rubbing treatment.

Besides, a display device with super twisted birefringement effects (STN) which is excellent in display contents has been developed for a large-sized display (T. J. Scheffer and J. Nehring, Appl. Phys. Lett. 45 (10), 1021 (1984)). For super twisted birefringement effects is used in a nematic liquid crystal blended with a chiral agent, an optically active material. In it, a liquid crystal molecule twists at 180° to 270° in a liquid crystal display device while that of a TN type twists at 90° or so, and the larger a twist angle, the better dependence upon visual angles. A large pretilt angle of liquid crystalline is required in order to enlarge a twist angle. Specifically, a pretilt angle is needed to be at least 5° in order to obtain a twist angle of 240° to 270°. At present, a liquid crystal display device with a twist angle of 240° to 270° is made practically using a conventional polyimide alignment layer from the viewpoint of heat resistance and chemical resistance.

However, though a polyimide layer is generally applied first of all on a substrate as a polyamic acid solution and then heated for ring closure, the layer gets tinged during heating to mar the appearance of the device and the light resistance of the layer. Further, it is necessary to heat it at a temperature of at least 250° C. in order to carry out a ring closure reaction, which may cause the deterioration of a plastic substrate and a colored filter. In addition, there is a problem that its adhesion with a glass substrate is not so strong.

Conventionally, as a means of enlarging a pretilt angle of a liquid crystal molecule are known a method of forming a oblique deposited layer of silicon oxide or the like and a method of forming a film of an organic polymer or the like having a long chain (Japanese Patent Public Disclosure Nos. 177514/89 and 297819/87) and subjecting the film to a rubbing treatment. However, there are problems that since oblique deposition of silicon oxide or the like is carried out according to a vacuum system, the cost for mass production becomes high and its producing ability is poor due to a batch treatment. Further, a method of subjecting a film of an organic polymer or the like having an alkyl long chain to a rubbing treatment has a problem that a pretilt angle changes largely according to a rubbing treatment and an annealing temperature (Japanese Patent Public Disclosure No. 197927/91).

On the other hand, Japanese Patent Public Disclosure No. 62616/89 discloses a random copolymer containing a polysiloxane compound and a polyaramide compound as an alignment layer material in which a pretilt angle has little dependence upon an annealing temperature. However, the alignment layer is characterized in that its pretilt angle is small; since a high pretilt angle is demanded in STN and TFT-LCD needing a broad visual angle, it is not suitable for practical use because its pretilt angle is smaller.

SUMMARY OF THE INVENTION

The object of the present invention is to provide a liquid crystal display device having a large pretilt angle with little dependence upon conditions including an annealing temperature. The other object of the present invention is to provide a liquid crystal display device whose pretilt angle can be optionally adjusted and which has a wide view angle.

It has now been found that the above objects can be achieved by using an aramide-silicone-multiblock copolymer as an alignment layer material of a liquid crystal display device.

DETAILED DESCRIPTION OF THE INVENTION

The present invention provides a liquid crystal display comprising a liquid crystal layer which is enclosed, in the sequence starting from the liquid crystal layer at least on one side by an alignment layer and on both sides by transparent electrodes and substrates, wherein at least one aramide-silicone-multiblock copolymer having the repeating unit represented by the following formula is used as an alignment layer on at least one of the two opposing surfaces of said substrates. The aramide-silicone-multiblock copolymer is a multiblock copolymer comprising a polyaramide compound and a polysiloxane compound.

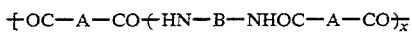

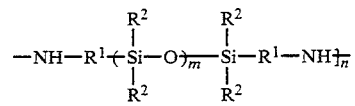

wherein m represents an integer of more than 1 and less than 100, preferably less than 50. n and x represent an integer of more than 1.

A represents para-phenylene group, meta-phenylene group, diphenylene group, naphthylene group, or

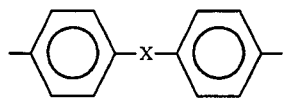

(X represents —O—, —SO$_2$—, —CO—, —S—, —C(CH$_3$)$_2$—, —C(CF$_3$)$_2$—, —SO— or —CH$_2$—); B represents a bivalent hydrocarbon radical.

R$^1$ represents a bivalent hydrocarbon radical having 1 to 5 carbon atoms; R$^2$ represents a monovalent straight-chain or branched-chain aliphatic hydrocarbon radical having 1 to 5 carbon atoms, an alicyclic hydrocarbon radical or an aromatic hydrocarbon radical; and the content o:f polysiloxane is 0.2 to 80%, preferably 1 to 50%.

As a hydrocarbon radical to be used as R$^1$ can be mentioned, for example, straight-chain alkenyl groups such as —CH$_2$—, —(CH$_2$)$_2$— and —(CH$_2$)$_3$— and branched-chain alkenyl groups. Preferably, R$^1$ is —(CH$_2$)$_3$—.

As an aliphatic hydrocarbon radical to be used as R$^2$ can be mentioned, for example, a methyl group, an ethyl group, a propyl group, an isopropyl group, an n-butyl group, an isobutyl group, a t-butyl group and a pentyl group. As an alicyclic hydrocarbon radical can be mentioned, for example, a cyclopropyl group, a cyclobutyl group, a cyclopentyl group and a cyclohexyl group. As an aromatic hydrocarbon radical can be mentioned, for example, a phenyl group, a tolyl group, a xylyl group, a biphenyl group, a naphthyl group, an anthryl group and a phenanthryl group. Those whose aromatic rings are substituted with halogen, a nitro group and the like can be also mentioned. Preferably, R$^2$ is a methyl group.

A polyaramide compound is formed from diamine (H$_2$N—B—NH$_2$) and a dichloride of dicarboxylic acid (HOOC—A—COOH). Specific examples of this diamine include aliphatic or alicyclic diamines such as 1,1-meta-xylenediamine, 1,3-propanediamine, tetramethylenediamine, pentamethylenediamine, hexamethylenediamine, octamethylenediamine, nonamethylenediamine, 4,4-diaminoheptamethylenediamine, 1,4-diaminocyclohexenone, isophoronediamine, tetrahydrodicyclopentadienylenediamine, hexahydro-4,7-methanoindanylenedimethyldiamine and tricyclo[6,2,1,0,2,7]-undecylenedimethyldiamine. Specific examples of aromatic diamine include m-phenylenediamine, p-phenylenediamine, 4,4'-diaminodiphenylmethane, 4,4'-diaminodiphenyl ether, 4,4'-diaminodiphenyl sulfone, 2,2-(4,4'-diaminodiphenyl)propane, 4,4'-diaminodiphenyl sulfide, 1,5-diaminonaphthalene, 4,4'-diaminodiphenylethane, m-toluenediamine, p-toluenediamine, 3,4'-diaminobenzanilido, 1,4-diaminonaphthalene, 3,3'-dicyclo-4,4'-diaminodiphenyl, benzidine, 4,4'-diaminodiphenylamine, 4,4'-diaminodiphenyl-N-methylamine, 4,4'-diaminodiphenyl-N-phenylamine, 3,3'-diaminodiphenyl sulfone, 4,4'-diaminodiphenyldiethyl silane, 4,4'-diaminodiphenyl silane, 3,4'-diaminodiphenylmethane, 1,1-diaminodiphenylethane, 3,4'-diaminodiphenyl ether, 3,4'-diaminodiphenyl sulfone, 2,2'-(3,4'-diaminodiphenyl)propane, 3,4'-diaminodiphenyl sulfide, 3,4'-diaminobenzanilido, 3,4'-diaminobenzophenone, 1,1-(3,4'-diaminodiphenyl)cyclohexane, 1,1-(3,4'-diaminodiphenyl)cyclopentane, 3,4'-diaminodiphenyldifluoromethane, 2,2-(3,4'-diaminodiphenyl)hexafluoropropane, 2,5,2',5'-tetramethyl-3,4'-diaminodiphenylmethane, 2,5,2',5'-tetramethyl-3,4'-diaminodiphenyl ether, 2,5,2',5'-tetramethyl-3,4'-diaminodiphenyl sulfone, 2,5,2',5'-tetramethyl-3,4'-diaminodiphenyl sulfide, 2,5,2',5'-tetramethyl-3,4'-diaminobenzanilido, 2,5,2',5'-tetramethyl-3,4'-diaminobenzophenone, 2,2'-dichloro-3,4'-diaminodiphenylmethane, 2,2'-dichloro-3,4'-diaminodiphenyl ether, 2,2'-dibromo-3,4'-diaminodiphenyl sulfone, 2,2'-difluoro-3,4'-diaminobenzophenone, 2,2-bis[4-(4-aminophenoxy)phenyl]propane, 2,2-bis[3-methyl-4-(4-aminophenoxy)phenyl]propane, 2,2-bis[3-bromo-4-(4-aminophenoxy)phenyl]propane, 2,2-bis[3-ethyl-4-(4-aminophenoxy)phenyl]propane, 2,2-bis[3-propyl-4-(4-aminophenoxy)phenyl]propane, 2,2-bis[3-isoropyl-4-(4-aminophenoxy)phenyl]propane, 2,2-bis[3-butyl-4-(4-aminophenoxy)phenyl]propane, 2,2-bis[3-sec-butyl-4-(4-aminophenoxy)phenyl]propane, 2,2-bis[3-methoxy-4-(4-aminophenoxy)phenyl]propane, 2,2-bis[3-ethoxy-4-(4-aminophenoxy)phenyl]propane, 2,2-bis[3,5-dimethyl-4-(4-aminophenoxy)phenyl]propane, 2,2-bis[3,5-dichloro-4-(4-aminophenoxy)phenyl]propane, 2,2-bis[3,5-dibromo-4-(4-aminophenoxy)phenyl]propane, 2,2-bis[3,5-dimethoxy-4-(4-aminophenoxy)phenyl1]propane, 2,2-bis[3-chloro-4-(4-aminophenoxy)-5-methylphenyl]propane, 1,1-bis[4-(4-aminophenoxy)phenyl]ethane, 1,1-bis[3-methyl-4-(4-aminophenoxy)phenyl]ethane, 1,1-bis[3-chloro-4-(4-aminophenoxy)phenyl]ethane, 1,1-bis[3-bromo-4-(4-aminophenoxy)phenyl]ethane, 1,1-bis[3-ethyl-4-(4-aminophenoxy)phenyl]ethane, 1,1-bis[3-propyl-4-(4-aminophenoxy)phenyl]ethane, 1,1-bis[3-isopropyl-4-(4-aminophenoxy)phenyl]ethane, 1,1-bis[3-butyl-4-(4-aminophenoxy)phenyl]ethane, 1,1-bis[3-sec-butyl-4-(4-aminophenoxy)phenyl]ethane, 1,1-bis[3-methoxy-4-(4-aminophenoxy)phenyl]ethane, 1,1-bis[3-ethoxy-4-(4-aminophenoxy)phenyl]ethane, 1,1-bis[3,5-dimethyl-4-(4-aminophenoxy)phenyl]ethane, 1,1-bis[3,5-dichloro-4-(4-aminophenoxy)phenyl]ethane, 1,1-bis[3,5-dibromo-4-(4-aminophenoxy)phenyl]ethane, 1,1-bis[3,5-dimethoxy-4-(4-aminophenoxy)phenyl]ethane, 1,1-bis[3-chloro-4-(4-aminophenoxy)-5-methylphenyl]ethane, bis[4-(4-aminophenoxy)phenyl]methane, bis[3-methyl-4-(4-aminophenoxy)phenyl]methane, bis[3-chloro-4-(4-aminophenoxy)phenyl]ethane, bis[3-bromo-4-(4-aminophenoxy)phenyl]methane, bis[3-ethyl-4-(4-aminophenoxy)phenyl]methane, bis[3-propyl-4-(4-aminophenoxy)phenyl]methane, bis[3-isoropyl-4-(4-aminophenoxy)phenyl]methane, bis[3-butyl-4-(4-aminophenoxy)phenyl]methane, bis[3-sec-butyl-4-(4-aminophenoxy)phenyl]methane, bis[3-methoxy-4-(4-aminophenoxy)phenyl]methane, bis[3-ethoxy-4-(4-aminophenoxy)phenyl]methane, bis[3,5-dimethyl-4-(4-aminophenoxy)phenyl]methane, bis[3,5-dichloro-4-(4-aminophenoxy)phenyl]methane, bis[3,5-dibromo-4-(4-aminophenoxy)phenyl]methane, bis[3,5-dimethoxy-4-(4-aminophenoxy)phenyl]methane, bis[3-chloromethoxy-4-(4-aminophenoxy)-5-methylphenyl]methane, 1,1,1,3,3,3-hexafluoro-2,2-bis[4-(4-aminophenoxy)phenyl]propane, 1,1,1,3,3,3-hexachloro-2,2-bis[4-(4-aminophenoxy)phenyl]propane, 3,3-bis[4-(4-aminophenoxy)phenyl]pentane, 1,1-bis[4-(4-aminophenoxy)phenyl]propane, 1,1,1,3,3,3-hexafluoro-2,2-bis[3,5-dimethyl-4-(4-aminophenoxy)phenyl]propane, 1,1,1,3,3,3-hexachloro-2,2-bis[3,5-dimethyl-4-(4-amino-phenoxy)phenyl]propane, 3,3-bis[3,5-dimethyl-4-(4-aminophenoxy)phenyl]pentane, 1,1-bis[3,5-dimethyl-4-(4-aminophenoxy)phenyl]propane, 1,1,1,3,3,3-hexafluoro-2,2-bis[3,5-dibromo-4-(4-aminophenoxy)phenyl]propane, 1,1,1,3,3,3-hexachloro-2,2-bis[3,5-dibromo-4-

(4-aminophenoxy)phenyl]propane, 3,3-bis[3,5-dibromo-4-(4-aminophenoxy)phenyl]pentane, 1,1-bis[3,5-dibromo-4-(4-aminophenoxy)phenyl]propane, 2,2-bis[4-(4-aminophenoxy)phenyl]butane, 2,2-bis[3-methyl-4-(4-aminophenoxy)phenyl]butane, 2,2-bis[3,5-dimethyl-4-(4-aminophenoxy)phenyl]butane, 2,2-bis[3,5-dibromo-4-(4-aminophenoxy)phenyl]butane, 1,1,1,3,3,3-hexafluoro-2,2-bis[3-methyl-4-(4-aminophenoxy) phenyl]propane, 1,1-bis[4-(4-aminophenoxy)phenyl]cyclohexane, 1,1-bis[4-(4-aminophenoxy)phenyl]cyclopentane, bis[4-(4-aminophenoxy)phenyl]sulfone, bis[4-(4-aminophenoxy)phenyl]ether, bis[4-(3-aminophenoxy)phenyl]sulfone, 4,4-carbonylbis(p-phenyleneoxy)dianiline and 4,4'-bis(4-aminophenoxy)biphenyl. Among them, 3,4'-diaminodiphenyl ether is preferable.

As a dichloride of dicarboxylic acid can be mentioned dichlorides of terephthalic acid, isophthalic acid, phthalic acid, diphenyl ether dicarboxylic acid diphenylsulfone dicarboxylic acid, diphenyl dicarboxylic acid and naphthalene dicarboxylic acid.

In conventional random copolymers repeating units are not arranged regularly as in multiblock copolymers and constituent unit parts of a polyaramide compound and a polysiloxane compound are arranged irregularly. It is thought that it causes that the pretilt angle cannot be given uniformly according to an annealing temperature and a rubbing strength.

On the other hand, the pretilt angle of the polyaramide-silicone-multiblock copolymer to be used in the present invention is nearly uniform irrespective of an annealing temperature and a rubbing strength. In addition, pretilt angles can be varied by only altering the content of a siloxane compound in the composition.

The annealing temperatures of the alignment layer in the present invention is preferably 100° to 350° C. The thickness of the layer is preferably 5 to 1,000 nm. In addition, a wide view angle can be obtained according to the present invention.

The molecular weight of the multiblock copolymer to be used in the present invention is generally 1,000 to 500,000, preferably 10,000 to 200,000.

The multiblock copolymer of the present invention can be obtained according to such a reaction as published by Imai et al. in Macromolecules Vol. 22, No. 11, 1989, while a conventional random copolymer has been obtained by a synthesis reaction. Into a mixture of diamine, triethylamine and triethylamine hydrochloride is dropped dichloride of dicarboxylic acid dissolved in a solvent such as chloroform in ice water under dry nitrogen, and the solution is stirred for several hours. To the reaction product is added a mixture of polydiamino siloxane and triethyldiamine dissolved in a solvent such as chloroform, and the mixture is stirred in ice water for several hours. Thereafter, the mixture is stirred at room temperature for several hours. It is purified and dried to obtain a desired polyaramide-silicone-multiblock copolymer. The thus synthesized polyaramide-silicone-multiblock copolymer has the following repeating constituent unit regularly:

[(polyaramide constituent unit part)−(polysiloxane constituent unit part)]n

The content of polysiloxane in the copolymer to be used in the present invention can be varied by changing polymerization degrees of polyaramide and/or polysiloxane to be used in the above reaction.

Further, according to the present invention, pretilt angles can be adjusted by mixing at least two kinds of aramide-silicone-multiblock copolymer resins having different contents of polysiloxane and besides a pretilt angle higher than that of an aramide-silicone-multiblock copolymer resin film having the same content of polysiloxane can be obtained. In addition, by incorporating a polyaramide resin with an aramide-silicone-multiblock copolymer resin, the pretilt angle of the aramide-silicone-multiblock copolymer can be adjusted optionally. It is because the pretilt angle can be decreased optionally by selecting the kinds and amounts of polyaramide resins to be added. Further, the viscosity of the aramide-silicone-multiblock copolymer resin can be optionally adjusted by adding a polyaramide resin. Preferably the polyaramide resin is composed of the aramide unit constituting the aramide-silicone-multiblock copolymer, but other polyaramides may be used. In addition, a wide view angle can be obtained by using a mixture of an aramide-silicone-multiblock copolymer and a polyaramide resin.

To the alignment layer materials of the present invention may be added further compounds generally used as alignment layer materials. Examples include polyurethane, polyester, polyimide and polycarbonate.

EXAMPLES

In Example, a polyaramide-silicone-multiblock copolymer having the repeating unit represented by the following formula was used:

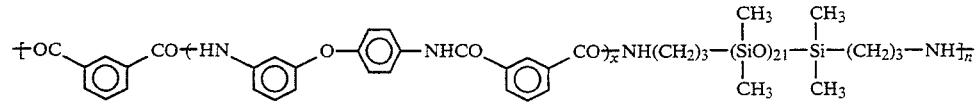

EXAMPLE 1

Polyaramide-silicone-multiblock copolymers having different contents of polydimethyl siloxane were dissolved into N,N-dimethylacetamide and glass substrates with ITO (indium tin oxide) were coated with a solution of 1.0% by weight of a polyaramide-silicone-multiblock resin at 1,000 r.p.m. according to an ordinary spin-coater method to form a thin alignment layer with a thickness of 50 nm. The films were treated at 180° C. for 1 hour to form polyaramide-silicone-multiblock resin films. The contents of polydimethyl siloxane in the polyaramide-silicone-multiblock resins used were 10% by weight, 20% by weight, 30% by weight and 50% by weight.

After the coated films were rubbed in one direction with a nylon cloth, a pair of the coated substrates was faced each other in such a manner that the rubbing direction was opposite to each other with a spacer of 20 μm. The nematic liquid crystal (ZLI 1565, manufactured by Merck) was introduced thereto to measure a pretilt angle. The results of measurement are shown in Table 1 below.

TABLE 1

| In polyaramide-silicone-multiblock resins: | |
|---|---|
| Content of polydimethyl siloxane | Pretilt angle |
| 10% by weight | 4° |
| 20% by weight | 7° |
| 30% by weight | 10° |
| 50% by weight | 18° |

As shown above, as the content of polydimethyl siloxane in the polyaramide-silicone-multiblock resin increases, so did a pretilt angle. Accordingly, a pretilt angle can be adjusted by only adjusting the content of polydimethyl siloxane in the polyaramide-silicone-multiblock resin. In addition, irrespective of the content of polydiamino siloxane, the reproducibility of pretilt angles in the cells in the same batch and from batch to batch were good.

EXAMPLE 2

A Polyaramide-silicone-multiblock copolymer having a content of polydimethyl siloxane of 10% by weight was dissolved into N,N-dimethylacetamide and glass substrates with ITO (indium tin oxide) were coated with a solution of 1.0% by weight of a Polyaramide-silicone-multiblock resin at 1,000 r.p.m. according to an ordinary spin-coater method to form a thin alignment layer with a thickness of 50 nm. The film was heat-treated for 1 hour changing an annealing temperature to form a Polyaramide-silicone-multiblock resin film.

After the coated films were rubbed in one direction with a nylon cloth, a pair of the coated substrates was faced each other in such a manner that the rubbing direction was opposite to each other with a spacer of 20 µm. The nematic liquid crystal (ZLI 1565, manufactured by Merck) was introduced thereto to measure a pretilt angle. The results of measurement are shown in Table 2 below..

TABLE 2

| Annealing temperature | Pretilt angle |
|---|---|
| 180° C. | 4.3° |
| 200° C. | 4.1° |
| 220° C. | 4.5° |

Though the annealing temperature was changed from 180° C. to 220° C., there was not seen a large change in pretilt angles. From this it was found that pretilt angles did not depend upon the annealing temperature and that their reproducibility was good.

EXAMPLE 3

A polyaramide-silicone-multiblock copolymer having a content of polydimethyl siloxane of 10% by weight was dissolved into N,N-dimethylacetamide and glass substrates with ITO (indium tin oxide) were coated with a solution of 1.0% by weight of a polyaramide-silicone-multiblock resin at 1,000 r.p.m. according to an ordinary spin-coater method to form a thin alignment layer. The film was heat-treated at an annealing temperature of 180° C. for 1 hour to form a polyaramide-silicone multiblock resin film.

After the coated films were rubbed with a nylon cloth in one direction with varying the clearance between the cloth and the substrate, a pair of the coated substrates was faced each other in such a manner that the rubbing direction was opposite to each other with a spacer of 20 µm. The nematic liquid crystal (ZLI 1565, manufactured by Merck) was introduced thereto to measure a pretilt angle. The results of measurement are shown in Table 3 below.

TABLE 3

| Clearance between cloth and substrate | Pretilt angle |
|---|---|
| 0.1 mm | 4.1° |
| 0.2 mm | 3.9° |
| 0.3 mm | 4.1° |
| 0.4 mm | 4.3° |

Though the clearance between the cloth and the substrate was changed from 0.1 mm to 0.4 mm, there was not seen a large change in pretilt angles. Accordingly, there was observed no dependence of pretilt angles on a rubbing strength.

EXAMPLE 4

A polyaramide-silicone-multiblock copolymer having a content of polydimethyl siloxane of 10% by weight was dissolved into N,N-dimethylacetamide and glass substrates with ITO (indium tin oxide) were coated with a solution of 0.25% by weight of a polyaramide-silicone-multiblock resin at 1,000 r.p.m. according to an ordinary spin-coater method to form a thin alignment layer with a thickness of 10 nm. The film was heat-treated at an annealing temperature of 180° C. for 1 hour to form a polyaramide-silicone-multiblock resin film.

After the coated films were rubbed in one direction with a nylon cloth, they were faced each other in such a manner that the rubbing direction was same to each other with a spacer of 1.6 µm. The ferroelectric liquid crystal (FELIX T120, FELIX T250, FELIX T251/00, FELIX T251/100 or FELIX T252, manufactured by Hoechst) was introduced thereto to measure a cone angle. For comparison, a polyaramide resin (POLIX 1001, manufactured by Hoechst), which is an alignment layer resin having a pretilt angle of about 0°, was used as an alignment layer material instead of polyaramide-silicone-multiblock resin, and a cone angle was measured analogously. The results of measurement are shown in Table 4 below.

TABLE 4

| | Cone Angle (°) | |
|---|---|---|
| Liquid Crystal | aramide-silicone-multiblock copolymer | POLIX 1001 |
| FELIX T120 | 23 | 18 |
| FELIX T250 | 25 | 21 |
| FELIX T251/00 | 27 | 21 |
| FELIX T251/100 | 27 | 21 |
| FELIX T252 | 23 | 16 |

As shown in Table 4, the increase of the cone angle was observed when using any ferroelectric liquid crystals. In addition, no defective alignments which decrease the contrast, such as a twist state or a zigzag defect, were observed.

When each ferroelectric liquid crystal was switched using a conventional pulse addressing method at an initial alignment state, i.e. a shebron structure, a high contrast was observed.

Further, when each ferroelectric liquid crystal was switched using a conventional pulse addressing method after a square pulse was applied to change the alignment state to a quasi-bookshelf structure, a high contrast was also observed.

EXAMPLE 5

A polyaramide-silicone-multiblock copolymer having a content of polydimethyl siloxane of 15% by weight was dissolved into N,N-dimethylacetamide and glass substrates with ITO (indium tin oxide) were coated with a solution of 1.0% by weight of a polyaramide-silicone-multiblock copolymer resin at 1,000 r.p.m. according to an ordinary spin-coater method to form a thin alignment layer with a thickness of 50 nm. The layer was heat-treated at an annealing temperature of 180° C. for 1 hour to form a polyaramide-silicone-multiblock copolymer resin film. After the coated films were rubbed in one direction with a nylon cloth, they were faced each other in such a manner that the rubbing direction was opposite to each other with a spacer of 20 μm. A nematic liquid crystal (LGT-5047, manufactured by Chissd) was introduced thereto to measure a pretilt angle. As a result of the measurement, a pretilt angle of 3.5° was obtained. The reproducibility of pretilt angles in the cells in the same batch and in the cells between batches were excellent.

EXAMPLE 6

A Polyaramide-silicone-multiblock copolymer resin having a content of polydimethyl siloxane of 50% was blended with a polyaramide-silicone-multiblock copolymer resin having a content of polydimethyl siloxane of 10% to prepare a mixture having a content of polydimethyl siloxane of 15% by weight. The mixture was dissolved into N,N-dimethylacetamide and glass substrates with ITO (indium tin oxide) were coated with a solution of 1.0% by weight of a polyaramide-silicone-multiblock copolymer resin at 1,000 r.p.m. according to an ordinary spin-coater method to form a thin alignment layer with a thickness of 50 nm. The layer was heat-treated at an annealing temperature of 180° C. for 1 hour to form a mixed resin film of polyaramide-silicone-multiblock copolymers. After the coated films were rubbed in one direction with a nylon cloth, they were faced each other in such a manner that the rubbing direction was opposite to each other with a spacer of 20 μm. A nematic liquid crystal (LGT-5047, manufactured by Chisso) was introduced thereto to measure a pretilt angle. As a result of the measurement, a pretilt angle of 4.0° was obtained. The reproducibility of pretilt angles in the cells in the same batch and in the cells between batches were excellent. Comparing the pretilt angle of the mixed resin film obtained by blending at least two kinds of polyaramide-silicone-multiblock copolymer resins having different contents of polysiloxane with that of the polyaramide-silicone-multiblock copolymer resin film having the same content of polysiloxane and not blended, the former was much higher. In addition, pretilt angles were adjusted by blending at least two kinds of polyaramide-silicone-multiblock copolymer resins having different contents of polysiloxane.

EXAMPLE 7

A polyaramide-silicone-multiblock copolymer resin having a content of polydimethyl siloxane of 55% was blended with a polyaramide resin constituting the polyaramide-silicone-multiblock copolymer to prepare a mixture having a content of polydimethyl siloxane of 15%. The mixture was dissolved into N,N-dimethylacetamide and glass substrates with ITO (indium tin oxide) were coated with a solution of a mixed resin of 1.0% by weight of a polyaramide-silicone-multiblock copolymer and a polyaramide resin at 1,000 r.p.m. according to an ordinary spin-coater method to form a thin alignment layer with a thickness of 50 nm. The layer was heat-treated at an annealing temperature of 180 ° C for 1 hour to form a mixed resin film of a polyaramide-silicone-multiblock copolymer and a polyaramide resin. After the coated films were rubbed in one direction with a nylon cloth, they were faced each other in such a manner that the rubbing direction was opposite to each other with a spacer of 20 μm. A nematic liquid crystal (LGT-5047, manufactured by Chisso) was introduced hereto to measure a pretilt angle. As a result of the measurement, a pretilt angle of 2.5° was obtained. The reproducibility of pretilt angles in the cells in same batch and in the cells between batches were excellent. Not only pretilt angles were decreased optionally by incorporating a polyaramide resin with a polyaramide-silicone-multiblock copolymer but also they were adjusted by adjusting a content of a polyaramide resin.

Though a polyaramide resin constituting an aramide-silicone-multiblock copolymer is used in the present Example, other polyaramide resins may be used.

What is claimed is:

1. A liquid crystal display comprising a liquid crystal layer. which is enclosed, in the sequence starting from the liquid crystal layer, at least on one side by an alignment layer and on both sides by transparent electrodes and substrates, wherein at least one aramide-silicone-multiblock copolymer having the repeating unit represented by the following formula is used as an alignment layer on at least one of the two opposing surfaces of said substrates:

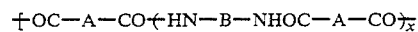

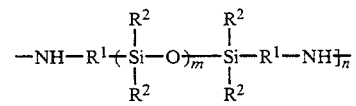

wherein m represents an integer of more than 1 and less than 100; n and x represent an integer of more than 1; A represents para-phenylene group, meta-phenylene group, diphenylene group, naphthylene group, or

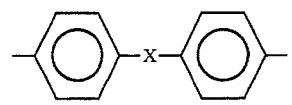

(X represents —O—, —$SO_2$—, —CO—, —S—, —C($CH_3$)$_2$—, —C($CF_3$)$_2$—, —SO— or —$CH_2$—); B represents a bivalent hydrocarbon radical; $R^1$ represents a bivalent hydrocarbon radical having 1 to 5 carbon atoms; $R^2$ represents a monovalent straight-chain or branched-chain aliphatic hydrocarbon radical having 1 to 5 carbon atoms, an alicyclic hydrocarbon radical or an aromatic hydrocarbon radical; and the content of polysiloxane is 0.2 to 80%.

2. The liquid crystal display device claimed in claim 1, wherein $R^1$ is —$CH^2$—, —($CH_2$)$_2$— or —($CH_2$)$_3$—.

3. The liquid crystal display device claimed in claim 1, wherein $R^1$ is —$(CH_2)_3$—.

4. The liquid crystal display device claimed in claim 1, wherein $R^2$ is methyl, ethyl, propyl, isopropyl, n-butyl, isobutyl, t-butyl, pentyl, cyclopropyl, cyclobutyl, cyclopentyl, cyclohexyl, phenyl, tolyl, xylyl, biphenyl, naphthyl, anthryl or phenanthryl group.

5. The liquid crystal display device claimed in claim 1, wherein $R^2$ is methyl group.

6. The liquid crystal display device claimed in claim 1, wherein A is meta-phenylene group.

7. The liquid crystal display device claimed in claim 1, wherein B is 3,4'-diphenyl ether group.

8. The liquid crystal display device claimed in claim 1, wherein $R^1$ is —$(CH_2)_3$—, $R^2$ is methyl group, A is meta-phenylene group and B is 3,4'-diphenyl ether group.

9. The liquid crystal display device claimed in claim 1, wherein the aramide-silicone-multiblock copolymer has a molecular weight of from 1,000 to 500,000.

10. A liquid crystal display device claimed in claim 1, wherein a mixture of at least two kinds of aramide-silicone-multiblock copolymer resins having different contents of polysiloxane is used as the alignment layer material.

11. A liquid crystal display comprising a liquid crystal layer which is enclosed, in the sequence starting from the liquid crystal layer, at least on one side by an alignment layer and on both sides by transparent electrodes and substrates, wherein at least one aramide-silicone-multiblock copolymer having the repeating unit represented by the following formula and at least one polyaramide resin is used as an alignment layer on at least one of the two opposing surfaces of said substrates:

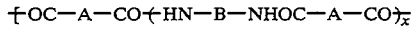

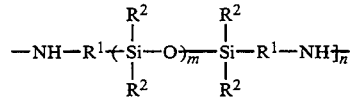

wherein m represents an integer of more than 1 and less than 100; n and x represent an integer of more than 1; A represents para-phenylene group, meta-phenylene group, diphenylene group, naphthylene group, or

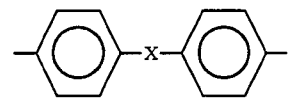

(X represents —O—, —$SO_2$—, —CO—, —S—, —$C(CH_3)_2$—, —$C(CF_3)_2$—, —SO— or —$CH_2$—); B represents a bivalent hydrocarbon radical; $R^1$ represents a bivalent hydrocarbon radical having 1 to 5 carbon atoms; $R^2$ represents a monovalent straight-chain or branched-chain aliphatic hydrocarbon radical having 1 to 5 carbon atoms, an alicyclic hydrocarbon radical or an aromatic hydrocarbon radical; and the content of polysiloxane is 0.2 to 80%.

12. The liquid crystal display device claimed in claim 11, wherein $R^1$ is —$CH_2$—, —$(CH_2)_2$— or —$(CH_2)_3$—.

13. The liquid crystal display device claimed in claim 11, wherein $R^1$ is —$(CH_2)_3$—.

14. The liquid crystal display device claimed in claim 11, wherein $R^2$ is methyl, ethyl, propyl, isopropyl, n-butyl, isobutyl, t-butyl, pentyl, cyclopropyl, cyclobutyl, cyclopentyl, cyclohexyl, phenyl, tolyl, xylyl, biphenyl, naphthyl, anthryl or phenanthryl.

15. The liquid crystal display device claimed in claim 11 wherein $R^2$ is methyl.

16. The liquid crystal display device claimed in claim 11, wherein A is meta-phenylene group.

17. The liquid crystal display device claimed in claim 11, wherein B is 3,4'-diphenyl ether group.

18. The liquid crystal display device claimed in claim 11, wherein $R^1$ is —$(CH_2)_3$—, $R^2$ is methyl group, A is meta-phenylene group and B is 3,4'-diphenyl ether group.

19. The liquid crystal display device claimed in claim 11, wherein the aramide-silicone-multiblock copolymer has a molecular weight of from 1,000 to 500,000.

20. A liquid crystal display device claimed in claim 11 wherein a mixture of at least two kinds of aramide-silicone-multiblock copolymer resins having different contents of polysiloxane is used as the alignment layer material.

21. The liquid crystal display device claimed in claim 11, wherein the polyaramide resin is composed of the aramide unit constituting the aramide-silicone-multiblock copolymer.

* * * * *

UNITED STATES PATENT AND TRADEMARK OFFICE
CERTIFICATE OF CORRECTION

PATENT NO. : 5,437,813
DATED : August 1, 1995
INVENTOR(S) : Akashi et al.

It is certified that error appears in the above-identified patent and that said Letters Patent is hereby corrected as shown below:

On the title page:

Item [73]: Correct the name of the assignee to read:

--Hoechst Aktiengesellschaft, Frankfurt am Main, Germany
  and Mitsuru Akashi, Kagoshima, Japan--

Signed and Sealed this

Third Day of December, 1996

Attest:

BRUCE LEHMAN

Attesting Officer                Commissioner of Patents and Trademarks